(12) United States Patent
Tazaki

(10) Patent No.: US 6,784,449 B2
(45) Date of Patent: Aug. 31, 2004

(54) RADIATION IMAGE RECORDING/READ-OUT METHOD AND APPARATUS, AND STIMULABLE PHOSPHOR SHEET

(75) Inventor: Seiji Tazaki, Kaisei-machi (JP)

(73) Assignee: Fuji Photo Film Co., Ltd., Kanagawa-ken (JP)

(*) Notice: Subject to any disclaimer, the term of this patent is extended or adjusted under 35 U.S.C. 154(b) by 174 days.

(21) Appl. No.: 10/114,117

(22) Filed: Apr. 3, 2002

(65) Prior Publication Data

US 2002/0190224 A1 Dec. 19, 2002

(30) Foreign Application Priority Data

Apr. 4, 2001 (JP) ......................................... 2001-106363

(51) Int. Cl.7 ................................................ G01T 1/105
(52) U.S. Cl. ........................................ 250/584; 250/581
(58) Field of Search .............................. 250/584, 581, 250/580, 484.4, 484.2, 483.1, 472.1

(56) References Cited

U.S. PATENT DOCUMENTS

| 4,258,264 A | | 3/1981 | Kotera et al. |
|---|---|---|---|
| 4,346,295 A | | 8/1982 | Tanaka et al. |
| 4,485,302 A | | 11/1984 | Tanaka et al. |
| 4,767,927 A | * | 8/1988 | Ohyama et al. ............. 250/585 |
| 5,012,107 A | * | 4/1991 | Kano et al. ............... 250/484.4 |
| 6,078,643 A | * | 6/2000 | Vogelsong et al. ......... 378/98.2 |
| 2001/0030301 A1 | * | 10/2001 | Cressens et al. ............ 250/581 |

FOREIGN PATENT DOCUMENTS

| EP | 55-12429 | 1/1980 |
|---|---|---|
| JP | 56-11395 | 2/1981 |
| JP | 56-11397 | 2/1981 |

* cited by examiner

Primary Examiner—Christine Sung
(74) Attorney, Agent, or Firm—Sughrue Mion, PLLC

(57) ABSTRACT

In a radiation image recording/read-out apparatus, a stimulable phosphor sheet having a reflective layer which is not longer than 5 μm in scattering length and is interposed between a stimulable phosphor layer and a support layer is used. Radiation is projected onto the stimulable phosphor sheet from the support layer side, and stimulating light is projected onto the stimulable phosphor sheet from the stimulable phosphor layer side. Stimulated emission, emitted from the stimulable phosphor layer upon exposure to the stimulating light, is detected from the stimulable phosphor layer side.

9 Claims, 6 Drawing Sheets

F I G. 4
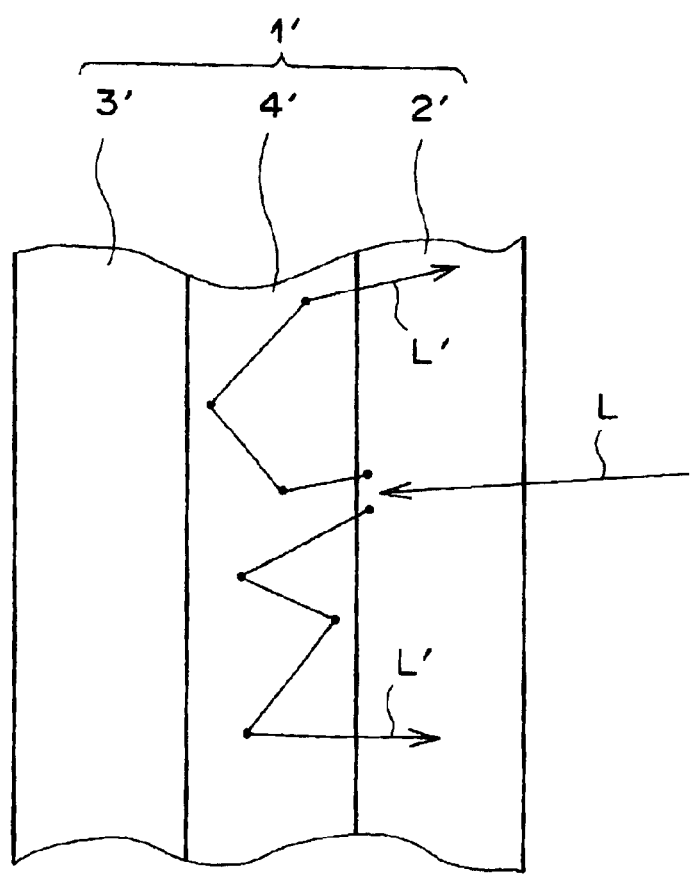

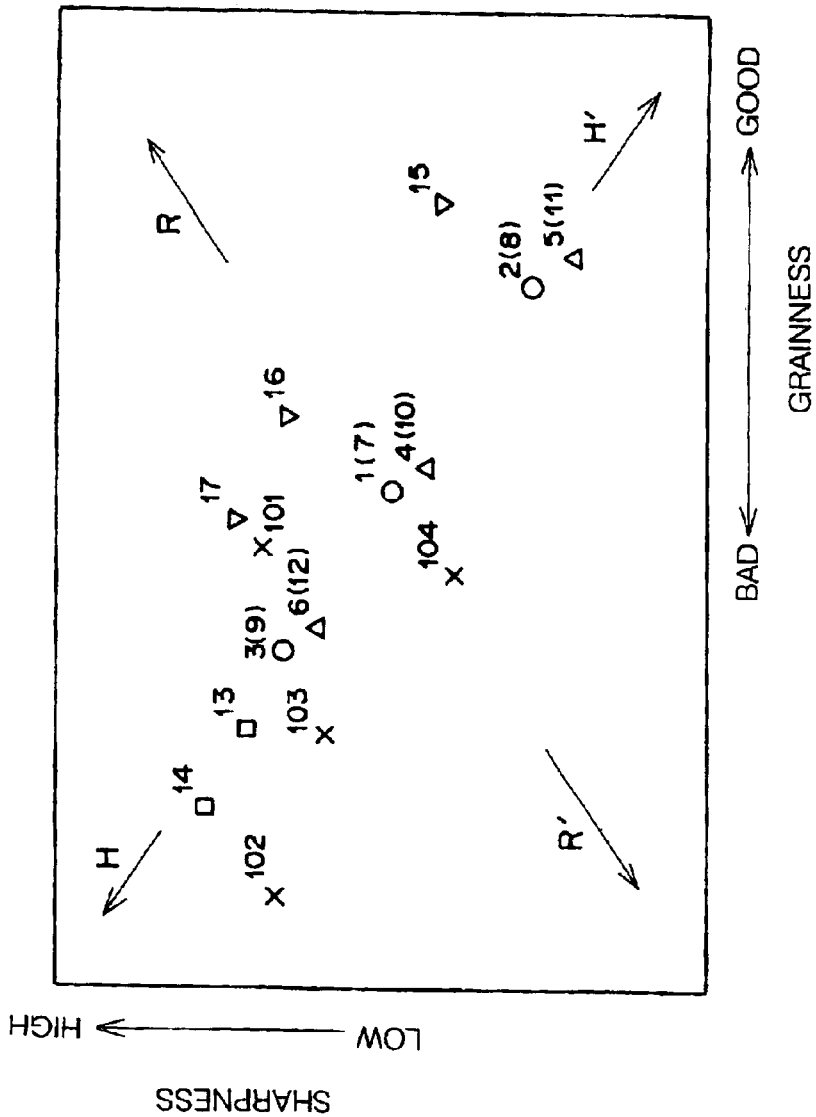

RADIATION IMAGE RECORDING/READ-OUT METHOD AND APPARATUS, AND STIMULABLE PHOSPHOR SHEET

BACKGROUND OF THE INVENTION

1. Field of the Invention

This invention relates to a radiation image recording/read-out method, a radiation image recording/read-out apparatus and a stimulable phosphor sheet, and more particularly to a radiation image recording/read-out method and a radiation image recording/read-out apparatus in which a radiation image is recorded from one side of a stimulable phosphor sheet and the radiation image recorded on the stimulable phosphor sheet is read out from the other side of the stimulable phosphor sheet, and a stimulable phosphor sheet suitable for the method and the apparatus.

2. Description of the Related Art

When certain kinds of phosphor are exposed to radiation such as X-rays, $\alpha$-rays, $\beta$-rays, electron-beams, ultraviolet rays and the like, they store a part of energy of the radiation. Then when the phosphor which has been exposed to the radiation is exposed to stimulating rays such as visible light, light is emitted from the phosphor in proportion to the stored energy of the radiation. A phosphor exhibiting such properties is generally referred to as "a stimulable phosphor". In this specification, the light emitted from the stimulable phosphor upon stimulation thereof will be referred to as "stimulated emission". There has been known a radiation image recording and reproducing system in which a stimulating light beam such as a laser beam is projected onto a stimulable phosphor sheet (a sheet provided with a layer of the stimulable phosphor) which has been exposed to radiation passing through an object such as a human body to have a radiation image of the object stored on the stimulable phosphor sheet, and the stimulated emission emitted from the stimulable phosphor sheet is photoelectrically detected, thereby obtaining an image signal (a radiation image signal). A radiation image of the object is reproduced as a visible image on the basis of the radiation image signal on a recording medium such as a photographic film or a display such as a CRT. See, for instance, Japanese Unexamined Patent Publications Nos. 55(1980)-12429, 56(1981)-11395 and 56(1981)-11397.

The stimulable phosphor sheet employed in such radiation image recording and read-out generally has a layered structure comprising a stimulable phosphor layer and a support layer which supports the stimulable phosphor layer. Projection of the radiation, projection of the stimulating light beam and detection of the stimulated emission are generally performed from the stimulable phosphor layer side. There have been known various apparatuses for recording on and/or read-out from the stimulable phosphor sheet, e.g., a radiation image recording apparatus which records radiation image information on the stimulable phosphor sheet, a radiation image read-out apparatus which reads out radiation image information recorded on the stimulable phosphor sheet, and a radiation image recording/read-out apparatus which is formed by integrating a radiation image recording apparatus and a radiation image read-out apparatus in a unit and includes a built-in stimulable phosphor sheet (will be referred to as "a built-in radiation image recording/read-out apparatus", hereinbelow).

In the built-in radiation image recording/read-out apparatus, there has been a demand that for miniaturizing the apparatus by arranging the apparatus so that a latent image of the object is recorded by projecting a radiation from the support layer side and the latent image is read out by projecting the stimulating light beam onto the stimulable phosphor sheet from the stimulable phosphor layer side and detecting the stimulated emission from the stimulable phosphor layer side.

That is, in the system where recording of the image and read-out of the image are performed from the same side of the stimulable phosphor sheet (this system will be referred to as "the same-side recording/read-out system", hereinbelow), there is required a conveyor system for conveying the stimulable phosphor sheet to the read-out system and turning the stimulable phosphor sheet over to oppose the same side of the stimulable phosphor sheet to the read-out system after recording of the image, which increases the overall size of the apparatus. To the contrast, in the system where recording of the radiation image and read-out of the image are performed from opposite sides of the stimulable phosphor sheet (this system will be referred to as "the opposite-side recording/read-out system", hereinbelow), the radiation image can be read out from the stimulable phosphor sheet without moving the stimulable phosphor sheet (or by moving by a very small distance) or turning over the same, which is advantageous to reduce the overall size of the apparatus.

However, in the opposite-side recording/read-out system, there has been a problem that the image quality of the radiation image obtained is bad as compared with that obtained by the same-side recording/read-out system.

That is, when the radiation is projected onto the stimulable phosphor sheet through the support layer, the latent image is formed in a part of the stimulable phosphor layer nearer to the support layer, and accordingly, when the stimulating light is projected onto the stimulable phosphor layer from the stimulable phosphor layer side, scattering and absorption of the stimulating light occur in the stimulable phosphor layer before the stimulating light reaches the part of the stimulable phosphor layer in which the latent image is formed, whereby the stimulating light is diverged and weakened. At the same time, the stimulated emission emitted from the part of the stimulable phosphor layer in which the latent image is formed is scattered and absorbed by the stimulable phosphor layer before it is radiated from the stimulable phosphor layer, whereby the area from which the stimulated emission is assumed to be emitted is broadened and the stimulated emission as radiated from the stimulable phosphor sheet is weakened. As a result, since noise is generated in the detected stimulated emission by scattered light (e.g., scattered stimulated emission, scattered stimulated emission emitted from surrounding stimulable phosphor stimulated by scattered stimulating light) and the stimulated emission is weakened, the image quality of the radiation image obtained by the opposite-side recording/read-out system is bad as compared with that obtained by the same-side recording/read-out system.

The stimulable phosphor sheets which have been conventionally employed are structured so that the radiation is projected from the stimulable phosphor layer side, and the power density of the stimulating light projected onto the stimulable phosphor sheet is generally about 4.5J/m$^2$.

The image quality of the radiation image is generally evaluated on the basis of the sharpness (MTF) and the graininess (as the amount of stimulated emission increases, the graininess is improved and as the stimulated emission emitting area is widened, the sharpness of the image deteriorates), and the higher the sharpness (MTF) or the grainness is, the better, the image quality is evaluated to be.

SUMMARY OF THE INVENTION

In view of the foregoing observations and description, the primary object of the present invention is to provide a radiation image recording/read-out method and a radiation image recording/read-out apparatus which makes it feasible to reduce the overall size of the apparatus without deteriorating image quality of the radiation image obtained, and to provide a stimulable phosphor sheet suitable for the method and the apparatus.

In accordance with a first aspect of the present invention, there is provided a radiation image recording/read-out method comprising the steps of projecting radiation onto a stimulable phosphor sheet, having a reflective layer which is not longer than 5 µm in scattering length and is interposed between a stimulable phosphor layer and a support layer, from the support layer side of the stimulable phosphor sheet, projecting stimulating light onto the stimulable phosphor sheet, which has been exposed to the radiation, from the stimulable phosphor layer side of the stimulable phosphor sheet, and detecting stimulated emission, emitted from the stimulable phosphor layer upon exposure to the stimulating light, from the stimulable phosphor layer side of the stimulable phosphor sheet.

In accordance with a second aspect of the present invention, there is provided a radiation image recording/read-out apparatus comprising a stimulable phosphor sheet having a reflective layer which is not longer than 5 µm in scattering length and is interposed between a stimulable phosphor layer and a support layer, a radiation projecting means which projects radiation onto the stimulable phosphor sheet from the support layer side of the stimulable phosphor sheet, and a read-out means which projects stimulating light onto the stimulable phosphor sheet, which has been exposed to the radiation, from the stimulable phosphor layer side of the stimulable phosphor sheet and detects stimulated emission, emitted from the stimulable phosphor layer upon exposure to the stimulating light, from the stimulable phosphor layer side of the stimulable phosphor sheet.

It is preferred that the read-out means projects the stimulating light at a power density of not lower than $10J/m^2$.

It is preferred that the transmittance to the radiation of the part of the stimulable phosphor sheet between the part where the radiation enters the stimulable phosphor sheet and the part where the radiation impinges upon the stimulable phosphor layer be not smaller than 80%.

It is preferred that the stimulable phosphor layer be colored by a coloring agent which selectively absorbs light of a wavelength which is equal to that of the stimulating light.

The radiation image recording/read-out apparatus of the present invention need not be of a built-in type where a radiation image information recording system and a radiation image information read-out system are integrated into a unit, but may be of a separate type where a radiation image recording apparatus and a radiation image read-out apparatus which are separately provided are used in combination with each other.

In accordance with a third aspect of the present invention, there is provided a stimulable phosphor sheet comprising a reflective layer which is not longer than 5 µm in scattering length and is interposed between a stimulable phosphor layer and a support layer, wherein radiation is projected onto the stimulable phosphor sheet from the support layer side, whereas stimulating light is projected onto the stimulable phosphor sheet from the stimulable phosphor layer side and stimulated emission, emitted from the stimulable phosphor layer upon exposure to the stimulating light, is detected from the stimulable phosphor layer side of the stimulable phosphor sheet.

The term "scattering length" as used here is the scattering length to the stimulating light or light of a wavelength which is equal to that of the stimulating light and means a mean distance by which the stimulating light travels straight before the stimulating light is once scattered. That the scattering length is shorter means that the light scattering performance is higher. The scattering length can be calculated by calculation based on Kubelka-Munk's theory.

In the present invention, stimulating light which enters the stimulable phosphor sheet from the stimulable phosphor layer side and travels toward the support layer through the stimulable phosphor layer is reflected by the reflective layer and reenters the stimulable phosphor layer to stimulate the stimulable phosphor, whereby the amount of stimulated emission emitted from the stimulable phosphor layer increases. At the same time, since the component of the stimulated emission traveling toward the support layer is reflected by the reflective layer to be radiated outward from the stimulable phosphor sheet, the amount of detected stimulated emission further increases. Further, since the latent image of the object is formed in a part of the stimulable phosphor layer nearer to the support layer and the scattering length of the reflective layer is not longer than 5 µm and is sufficiently short, the area over which the stimulating light is reflected by the reflective layer and the area over which the stimulated emission reenters the stimulable phosphor layer are limited to that near the optical path of the stimulating light entering from the stimulable phosphor layer side.

As a result, deterioration of the image quality (grainness and sharpness) of the radiation image obtained can be prevented even if the aforesaid opposite-side recording/read-out system, which is advantageous in reducing the size of the radiation image recording/read-out apparatus, is employed.

When the power density of the stimulating light is not lower than $10J/m^2$, the amount of stimulated emission emitted from a unit area of the stimulable phosphor layer can be increased with the stimulated emission emitting area suppressed from being widened, whereby the grainness of the radiation image obtained can be improved with deterioration of the sharpness suppressed and the image quality of the radiation image obtained can be further improved.

When the transmittance to the radiation of the part of the stimulable phosphor sheet between the part where the radiation enters the stimulable phosphor sheet and the part where the radiation impinges upon the stimulable phosphor layer is not smaller than 80%, deterioration of radiation energy stored in the stimulable phosphor can be prevented and the amount of stimulated emission emitted from the stimulable phosphor can be increased with the stimulated emission emitting area kept unchanged. As a result, the grainness of the radiation image obtained can be improved with the sharpness of the radiation image obtained kept unchanged and the image quality of the radiation image obtained can be further improved.

When the stimulable phosphor layer is colored by a coloring agent (e.g., ultramarine) which selectively absorbs light of a wavelength which is equal to that of the stimulating light, scattering of stimulated emission to be detected is suppressed, whereby the stimulated emission emitting area can be narrowed and the quality of the radiation image obtained can be changed toward a direction in which the graininess is roughened and the sharpness is enhanced.

BRIEF DESCRIPTION OF THE DRAWINGS

FIG. 4 is a view showing behavior of the stimulating light impinging upon a reflective layer which is long in scattering length, FIG. 6 is a view showing the result of the experiment.

DESCRIPTION OF THE PREFERRED EMBODIMENT

Figure 1:
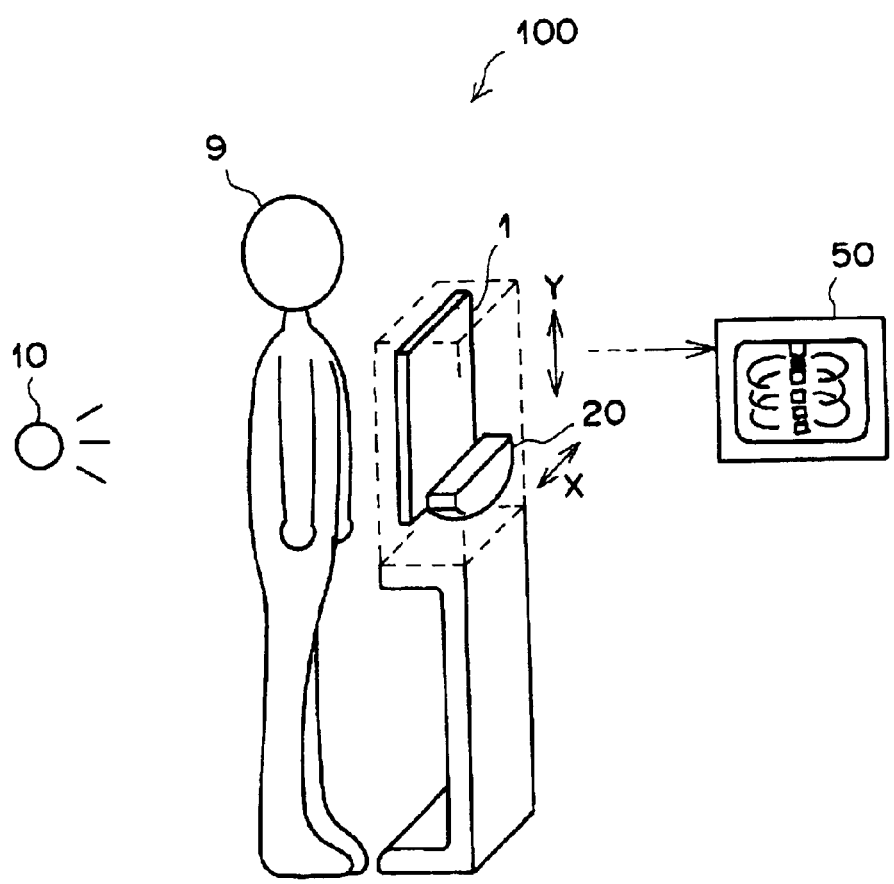
FIG. 1 is a schematic perspective view showing a radiation image recording/read-out apparatus in accordance with an embodiment of the present invention.
Figure 2:
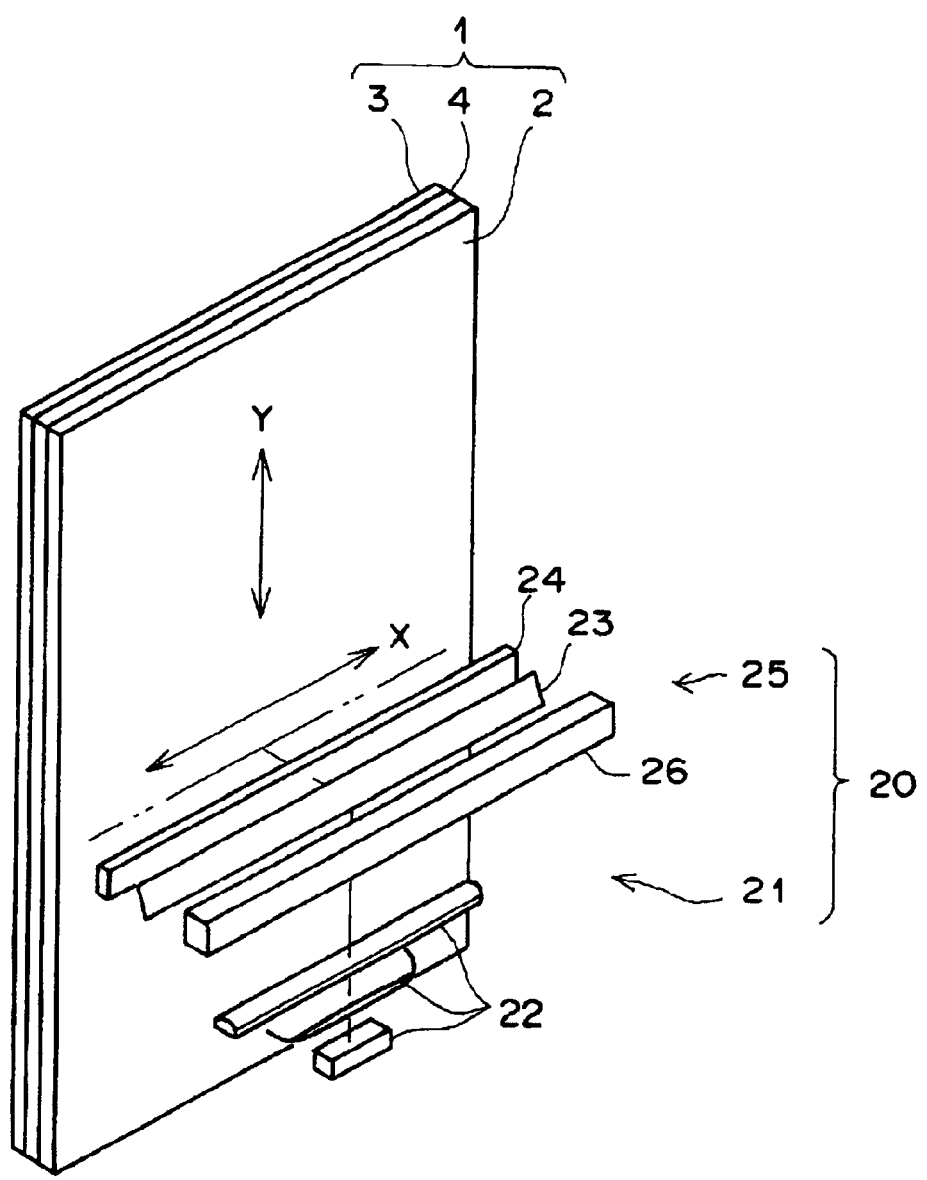
FIG. 2 is an enlarged perspective view showing the stimulable phosphor sheet and the read-out means.

As shown in FIGS. 1 and 2, a radiation image recording/read-out apparatus 100 in accordance with an embodiment of the present invention comprises a stimulable phosphor sheet 1 having a reflective layer 4 which is not longer than 5 $\mu$m in scattering length and is interposed between a stimulable phosphor layer 2 and a support layer 3. The radiation image recording/read-out apparatus 100 further comprises a radiation projecting means 10 which projects radiation onto the stimulable phosphor sheet 1 from the support layer side of the stimulable phosphor sheet 1, and a read-out means 20 which projects stimulating light onto the stimulable phosphor sheet 1, which has been exposed to the radiation, from the stimulable phosphor layer side of the stimulable phosphor sheet 1 and detects stimulated emission, emitted from the stimulable phosphor layer 2 upon exposure to the stimulating light, from the stimulable phosphor layer side of the stimulable phosphor sheet 1.

The radiation projecting means 10 generates radiation such as X-rays and projects the radiation onto the stimulable phosphor sheet 1 through an object.

The read-out means 20 comprises a stimulating light projecting section 21 which projects stimulating light onto the stimulable phosphor sheet 1 from the stimulable phosphor layer side, and a stimulated emission detecting section 25 which detects stimulated emission, emitted from the stimulable phosphor sheet 1 upon exposure to the stimulating light, from the stimulable phosphor layer side.

The stimulating light projecting section 21 comprises a linear light source 22 which is formed by a broad area semiconductor laser and an optical system such as a toric lens and emits a line stimulating light beam, a dichroic mirror 23 which squarely reflects the line stimulating light beam radiated from the light source 22 and a lens array 24 which is an array of a plurality of refractive index profile type lenses arranged in the direction of arrow X and converges the line stimulating light beam reflected by the dichroic mirror 23 to impinge upon the stimulable phosphor sheet 1 in a pattern of a line extending in the direction of arrow X.

The stimulated emission detecting section 25 comprises a lens array 24 (common to both the stimulating light projecting section 21 and the stimulated emission detecting section 25) which images line-like stimulated emission, emitted from the part of the stimulable phosphor sheet 1 exposed to the stimulating light beam, on a line sensor 26 and the line sensor 26 comprising an array of photoelectric convertor elements which are arranged in the direction of arrow X and detects the line-like stimulated emission imaged on the line sensor 26 through the lens array 26 and the dichroic mirror 23.

The dichroic mirror 23 reflects the stimulating light and transmits the stimulated emission, and accordingly, stimulated emission included as noise in the stimulated emission impinging upon the line sensor 26 is cut by the dichroic mirror 23.

The radiation image recording/read-out apparatus 100 of this embodiment further comprises a conveyor means (not shown) which conveys the read-out means 20 along the stimulable phosphor sheet 1 in a direction of arrow Y normal to the direction of arrow X in which the line-like portion of the stimulable phosphor sheet 1 irradiated by the line stimulating light beam extends so that the read-out means 20 reads out, as two-dimensional information, radiation image information recorded on the stimulable phosphor sheet 1 by detecting stimulated emission emitted from the stimulable phosphor sheet 1 while moving the line stimulating light beam, extending in the direction of arrow X, in the direction of arrow Y. Instead, radiation image information recorded on the stimulable phosphor sheet 1 may be read by moving the stimulable phosphor sheet 1 in the direction of arrow Y with the read-out means 20 held stationary.

As the system for reading out radiation image information from the stimulable phosphor sheet 1, a point scan system in which the stimulating light is focused in a spot on the surface of the stimulable phosphor sheet, the spot is caused to scan the surface of the stimulable phosphor sheet by the use of a scanning optical system comprising, for instance, a laser and a polygonal mirror, while moving one of the stimulable phosphor sheet 1 and the read-out means 20 relatively to the other, and stimulated emission emitted from the points of the stimulable phosphor sheet 1 is led to a photomultiplier by a light guide such as of acrylic resin may be employed instead of the aforesaid line scan system in which a linear stimulating light beam is projected onto the stimulable phosphor sheet 1 to irradiate a line-like portion extending while moving one of the stimulable phosphor sheet 1 and the read-out means 20 relatively to the other and stimulated emission emitted from the line-like portions is detected by a line sensor.

It is preferred that the reflective layer 4 of the stimulable phosphor sheet 1 be a porous layer of white particles of, for instance, alumina, yttrium oxide, or zirconium oxide, bound by a small amount of binder. Such a reflective layer is low in density and high in transmittance to radiation.

The support layer 3 of the stimulable phosphor sheet 1 is of a resin material such as polyethylene terephthalate, polyethylene naphthalate, aramid resin or polyimide resin, a metal sheet, a ceramic sheet or a glass plate, and is formed so that the sum of the transmittance to the radiation of the support layer 3 and that of the reflective layer 4 is not smaller than 80%.

The stimulable phosphor layer 2 of the stimulable phosphor sheet 1 is formed, for instance, by dispersively applying stimulable phosphor particles together with binder to the reflective layer or depositing a stimulable phosphor material on the reflective layer 4.

The operation of the radiation image recording/read-out apparatus 100 of this embodiment will be described.

Figure 3:
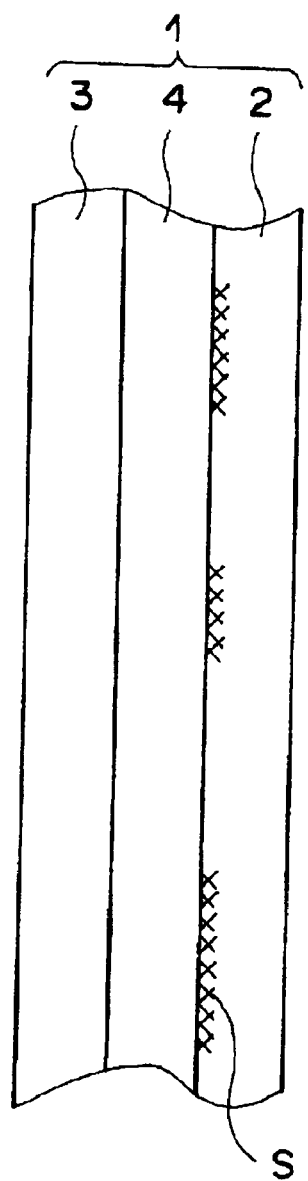
FIG. 3 is a cross-sectional view of the stimulable phosphor sheet.

Radiation radiated from the radiation projecting means 10 enters the stimulable phosphor sheet 1 from the support layer side through an object 9 (FIG. 1) and irradiates the stimulable phosphor layer 2 passing through the support layer 3 and the reflective layer 4, whereby a latent image S (FIG. 3) is formed in the stimulable phosphor layer 2. The latent image S is more formed in a part of the stimulable phosphor layer 2 nearer to the support layer 3.

Then line stimulating light beam radiated from the stimulating light projecting section 21 is projected onto the stimulable phosphor sheet 1 from the stimulable phosphor layer side to excite the stimulable phosphor in the stimulable phosphor layer 2. The stimulable phosphor exposed to the stimulating light beam emits stimulated emission in proportion to the intensity of radiation to which the phosphor was exposed.

The stimulated emission emitted from the stimulable phosphor propagates through the stimulable phosphor sheet 1 to be radiated outside the stimulable phosphor sheet 1 and is detected by the stimulated emission detecting section 25 through the lens array 24.

The read-out means 20 is conveyed along the stimulable phosphor sheet 1 in the direction of arrow Y while projecting a line stimulating light beam extending in the direction of arrow X and detecting the stimulated emission emitted from the line-like portion of the stimulable phosphor layer 2 exposed to the stimulating light beam, whereby two-dimensional radiation image information recorded on the stimulable phosphor sheet 1 is detected. A radiation image is displayed on a display 50 on the basis of the radiation image information thus obtained.

When a reflective layer 4' long in scattering length, e.g., equivalent to the scattering length of the support layer, is interposed between a stimulable phosphor layer 2' and a support layer 3' as shown in FIG. 4, the stimulating light beam L entering the stimulable phosphor layer 2' propagates a longer distance before it reenters the stimulable phosphor layer 2' after reflected by the reflective layer 4' a plurality of times as compared with in a stimulable phosphor sheet I having a reflective layer 4 short in scattering length (FIG. 5), and accordingly, the intensity of the reflected stimulating light L' is greatly attenuated before it reenters the stimulable phosphor layer 2' and the reflected stimulating light L' reenters the stimulable phosphor layer 2' over a larger area. This the same as for the stimulated emission.

Figure 5:
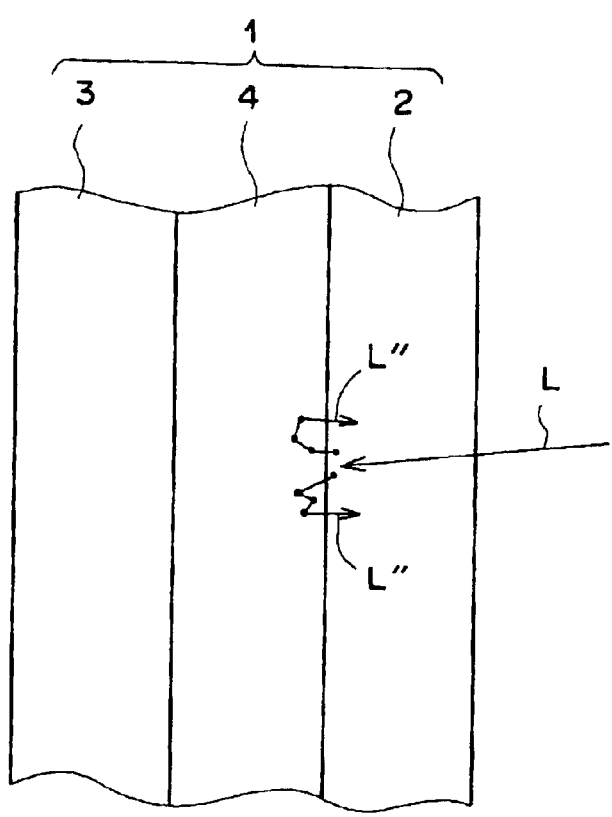
FIG. 5 is a view showing behavior of the stimulating light impinging upon a reflective layer which is short in scattering length.

To the contrast, when a reflective layer 4 short in scattering length is interposed between a stimulable phosphor layer 2 and a support layer 3 as shown in FIG. 5, the stimulating light beam L entering the stimulable phosphor layer 2 propagates a shorter distance before it reenters the stimulable phosphor layer 2 after reflected by the reflective layer 4 a plurality of times, and accordingly, the intensity of the reflected stimulating light L" is less attenuated before it reenters the stimulable phosphor layer 2 and the area over which the reflected stimulating light L" reenters the stimulable phosphor layer 2 are limited to that near the optical path of the stimulating light L entering the stimulable phosphor layer 2.

As can be understood from the above description, as compared with when a stimulable phosphor sheet without a reflective layer is employed, when a stimulable phosphor sheet with a reflective layer is employed, the amount of stimulated emission emitted from the stimulable phosphor layer increases and the stimulated emission emitting area is limited, whereby the image quality (the grainness and the sharpness) of the radiation image obtained is improved.

The effect of the reflective layer was proved by experiments. The result of the experiments was as follows.

Experiments 1 to 17 were carried out by the use of stimulable phosphor sheets in accordance with embodiments of the present invention and experiments 101 to 104 were carried out by the use of stimulable phosphor sheets in accordance with comparative examples (not in accordance with the present invention). The experiment conditions were as shown in the following table 1.

TABLE 1

| ex. No. | reflective layer | scattering length | stimulating light intensity | ultra-marine | phosphor layer thickness | read-out system | radiation projecting side |
| --- | --- | --- | --- | --- | --- | --- | --- |
| 1 | exist | 2.5 $\mu$m | × 1 | no | 270 $\mu$m | point scan | support layer |
| 2 | exist | 2.5 $\mu$m | × 1 | no | 300 $\mu$m | point scan | support layer |
| 3 | exist | 2.5 $\mu$m | × 1 | no | 240 $\mu$m | point scan | support layer |
| 4 | exist | 3.5 $\mu$m | × 1 | no | 270 $\mu$m | point scan | support layer |
| 5 | exist | 3.5 $\mu$m | × 1 | no | 300 $\mu$m | point scan | support layer |
| 6 | exist | 3.5 $\mu$m | × 1 | no | 240 $\mu$m | point scan | support layer |
| 7 | exist | 2.5 $\mu$m | × 1 | no | 270 $\mu$m | line scan | support layer |
| 8 | exist | 2.5 $\mu$m | × 1 | no | 300 $\mu$m | line scan | support layer |
| 9 | exist | 2.5 $\mu$m | × 1 | no | 240 $\mu$m | line scan | support layer |
| 10 | exist | 3.5 $\mu$m | × 1 | no | 270 $\mu$m | line scan | support layer |
| 11 | exist | 3.5 $\mu$m | × 1 | no | 300 $\mu$m | line scan | support layer |
| 12 | exist | 3.5 $\mu$m | × 1 | no | 240 $\mu$m | line scan | support layer |
| 13 | exist | 2.5 $\mu$m | × 1 | 10 mg | 240 $\mu$m | point scan | support layer |
| 14 | exist | 2.5 $\mu$m | × 1 | 30 mg | 240 $\mu$m | point scan | support layer |
| 15 | exist | 2.5 $\mu$m | × 5 | no | 270 $\mu$m | point scan | support layer |
| 16 | exist | 2.5 $\mu$m | × 5 | 10 mg | 240 $\mu$m | point scan | support layer |
| 17 | exist | 2.5 $\mu$m | × 5 | 30 mg | 240 $\mu$m | point scan | support layer |
| 101 | no | | × 1 | added | 230 $\mu$m | point scan | phosphor layer |
| 102 | no | | × 1 | added | 230 $\mu$m | point scan | support layer |
| 103 | no | | × 5 | added | 230 $\mu$m | point scan | support layer |
| 104 | exist | ≧8 $\mu$m | × 1 | no | 270 $\mu$m | point scan | support layer |

The following conditions were common to all the experiments.

Object: 2 cycle/mm MTF measuring pattern
Tube voltage of the radiation projecting means: 80 Kv
Side from which the stimulating light beam is projected and stimulated emission is detected: stimulable phosphor layer side Experiment 1

A radiation image was obtained by reading out radiation image information recorded on a stimulable phosphor sheet of the following structure with the following read-out system.

a) structure of the stimulable phosphor sheet (the following layers were formed in this order)
stimulable phosphor layer: 270 μm thick (added with no ultramarine)
reflective layer: 50 μm thick (2.5 μm scattering length)
support layer: 250 μm thick (PET)

b) radiation projecting side and stimulated emission read-out system
radiation projecting side: radiation was projected from the support layer side
read-out system: point scan system
intensity of the stimulating light: ×1 (normal intensity)

Experiment 2

Carried out in the same manner as the experiment 1 except that the stimulable phosphor layer was 300 μm thick.

Experiment 3

Carried out in the same manner as the experiment 1 except that the stimulable phosphor layer was 240 μm thick.

Experiment 4

Carried out in the same manner as the experiment 1 except that the reflective layer was 3.5 μm in scattering length.

Experiment 5

Carried out in the same manner as the experiment 2 except that the reflective layer was 3.5 μm in scattering length.

Experiment 6

Carried out in the same manner as the experiment 3 except that the reflective layer was 3.5 μm in scattering length.

Experiment 7

Carried out in the same manner as the experiment 1 except that the line scan read-out system was employed in place of the point scan system.

Experiment 8

Carried out in the same manner as the experiment 2 except that the line scan read-out system was employed in place of the point scan system.

Experiment 9

Carried out in the same manner as the experiment 3 except that the line scan read-out system was employed in place of the point scan system.

Experiment 10

Carried out in the same manner as the experiment 4 except that the line scan read-out system was employed in place of the point scan system.

Experiment 11

Carried out in the same manner as the experiment 5 except that the line scan read-out system was employed in place of the point scan system.

Experiment 12

Carried out in the same manner as the experiment 6 except that the line scan read-out system was employed in place of the point scan system.

Experiment 13

Carried out in the same manner as the experiment 3 except that ultramarine was added to the stimulable phosphor layer in an amount of 10 mg per 100 g of the stimulable phosphor.

Experiment 14

Carried out in the same manner as the experiment 3 except that ultramarine was added to the stimulable phosphor layer in an amount of 30 mg per 100 g of the stimulable phosphor.

Experiment 15

Carried out in the same manner as the experiment 1 except that the intensity of the stimulating light was increased to five times.

Experiment 16

Carried out in the same manner as the experiment 13 except that the intensity of the stimulating light was increased to five times.

Experiment 17

Carried out in the same manner as the experiment 14 except that the intensity of the stimulating light was increased to five times.

Experiment 101

A radiation image was obtained by reading out radiation image information recorded on a stimulable phosphor sheet ST-Vn of the following structure from the stimulable phosphor layer side with the following read-out system.

a) structure of the stimulable phosphor sheet ST-Vn (the following layers were formed in this order)
protective layer: 3 μm thick
stimulable phosphor layer: 230 μm thick
reflective layer: no
ultramarine prime coating on support layer: 20 μm thick
support layer: 350 μm thick (PET)

The stimulable phosphor sheet ST-Vn is a stimulable phosphor sheet without reflective layer which has been commercially available and has been designed so that projection of radiation and read-out of stimulated emission are performed from the stimulable phosphor layer side.

b) radiation projecting side and stimulated emission read-out system
radiation projecting side: radiation was projected from the support layer side
read-out system: point scan system
intensity of the stimulating light: ×1 (normal intensity)

Experiment 102

Carried out in the same manner as the experiment 101 except that the radiation was projected from the support layer side.

Experiment 103

Carried out in the same manner as the experiment 102 except that the intensity of the stimulating light was increased to five times.

Experiment 104

Carried out in the same manner as the experiment 1 except that the reflective layer was 8 μm in scattering length.

FCR9000 (Fuji Film Co.) was employed for reading out radiation image information in the point scan system.

The result of the experiments which were carried out under the conditions described above will be described with reference to FIG. 6, where the ordinate represents the sharpness (the value of MTF at 2 cycles/mm) and abscissa represents the graininess), hereinbelow. In FIG. 6, figures represent the numbers of the experiment and those in brackets represent the numbers of the experiment where the line scan system was employed.

The image quality of the radiation image governed by the sharpness and the graininess as described above. Even if the image quality if shifted in the direction of arrow H in which the sharpness is enhanced and the graininess is deteriorated or the image quality is shifted in the direction of arrow H' in which the sharpness is deteriorated and the graininess is enhanced, the image quality is evaluated to be of the same level. The image quality is evaluated to be changed when the image quality is shifted in a direction other than the directions of arrows H–H'. For example, when the image quality is shifted in the direction of arrow R in which the sharpness is enhanced and the grainness is enhanced, the image quality is improved, and when the image quality is shifted in the direction of arrow R' in which the sharpness is deteriorated and the grainness is deteriorated, the image quality is deteriorated.

Influence on the image quality of the thickness of the stimulable phosphor layer, addition of ultramarine, the read-out system, the scattering length of the reflective layer, the intensity of the stimulating light and the side from which the radiation is projected onto the stimulable phosphor sheet which were parameters in the above experiments will be described, hereinbelow.

Influence of the thickness of the stimulable phosphor layer on the image quality: When experiments 1, 2 and 3, where only the thickness of the stimulable phosphor layer differs from each other with the other conditions substantially equivalent to each other, are compared with each other, the image qualities are of the same level since the image quality differs from each other in the directions of arrows H–H'. Further, when experiments 4, 5 and 6, where only the thickness of the stimulable phosphor layer differs from each other with the other conditions substantially equivalent to each other, are compared with each other, the image qualities are of the same level. From this fact, it may be concluded that the thickness of the stimulable phosphor layer hardly affects the level of the image quality (i.e., though the image quality changes, the level of the image quality is held unchanged with change of the thickness of the stimulable phosphor layer).

Influence of addition of ultramarine on the image quality: When experiments 3, 13 and 14, where only the amount of ultramarine added differs from each other with the other conditions substantially equivalent to each other, are compared with each other, the image qualities are of the same level since the image quality differs from each other in the directions of arrows H–H'. This means that addition of ultramarine does not change the image quality level.

Influence of the scattering length of the reflective layer on the image quality: When experiments 1, 4 and 104 or experiments 2 and 5 or experiments 3 and 6, where only the scattering length of the reflective layer differs from each other with the other conditions substantially equivalent to each other, are compared with each other, the image quality changes in a direction intersecting the directions of arrows H–H' and the image quality level is increased as the scattering length of the reflective layer becomes shorter. For example, in the experiments 1 and 4, where the scattering length is smaller than 5 μm and is shorter than in the experiment 104 where the scattering length is not shorter than 8 μm, the image quality level is apparently higher than in experiment 104 and is practically equivalent to in experiment 101 where the radiation was projected onto the stimulable phosphor sheet from the stimulable phosphor layer side.

Influence of the intensity of the stimulating light on the image quality: When experiments 1 and 15 or experiments 13 and 16 or experiments 14 and 17, or experiments 102 and 103 where only the intensity of the stimulating light differs from each other with the other conditions substantially equivalent to each other, are compared with each other, the image quality changes in a direction intersecting the directions of arrows H–H' and the image quality level is increased as the intensity of the stimulating light increases. Especially, the grainness is greatly enhanced. This increase in image quality level is more significant in the experiments where a stimulable phosphor sheet with a reflective layer is employed than the experiments (experiments 102 and 103) where a stimulable phosphor sheet without a reflective layer is employed. This means that the effect of increasing the amount of stimulated emission (improving the grainness) and of suppressing widening of stimulated emission emitting area (suppressing deterioration of sharpness) by the reflective layer is enhanced as the intensity of the stimulating light increases. For example, in experiment 17, a radiation image of higher image quality than in experiment 101, where projection of radiation onto the stimulable phosphor sheet and read-out of stimulated emission were both done from the stimulable phosphor layer side), was obtained.

Influence on the image quality of the side from which the radiation is projected onto the stimulable phosphor sheet: When experiments 101 and 102, where only the side from which the radiation is projected onto the stimulable phosphor sheet differs from each other with the other conditions substantially equivalent to each other, are compared with each other, the image quality changes in a direction intersecting the directions of arrows H–H' and it means that when a stimulable phosphor sheet which has been commercially available is used in such a manner that radiation is projected onto the stimulable phosphor sheet from the support layer side and stimulated emission is detected from the stimulable phosphor layer side, the image quality will be greatly deteriorated.

It will be understood from comparison of experiment 1 with experiment 7, or of experiment 2 with experiment 8, or of experiment 3 with experiment 9, or of experiment 4 with experiment 10, or of experiment 5 with experiment 11, or of experiment 6 with experiment 12 that the difference in read-out system hardly affects the image quality (sharpness and grainness). Accordingly, the result of the experiments subjected to the comparison described above is denoted by the same symbol (○ or △).

As can be understood from the description above, in accordance with the present invention, by using a stimulable phosphor sheet comprising an reflective layer which is interposed between a stimulable phosphor layer and a support layer and is short in scattering length, projecting radiation onto the stimulable phosphor sheet from the support layer side and projecting stimulating light and detecting stimulated emission from the stimulable phosphor layer side, the overall size of the apparatus can be reduced without deteriorating the image quality of the radiation image obtained.

What is claimed is:

1. A radiation image recording/read-out method comprising the steps of projecting radiation onto a stimulable phosphor sheet, having a reflective layer which is not longer than 5 μm in scattering length and is interposed between a stimulable phosphor layer and a support layer, from the support layer side of the stimulable phosphor sheet, projecting stimulating light onto the stimulable phosphor sheet, which has been exposed to the radiation, from the stimulable phosphor layer side of the stimulable phosphor sheet, and detecting stimulated emission, emitted from the stimulable phosphor layer upon exposure to the stimulating light, from the stimulable phosphor layer side of the stimulable phosphor sheet.

2. The radiation image recording/read-Out method of claim 1, wherein the reflecting layer is in direct physical contact with the support layer and the stimulable phosphor layer.

3. A radiation image recording/read-out apparatus comprising a stimulable phosphor sheet having a reflective layer which is not longer than 5 μm in scattering length and is interposed between a stimulable phosphor layer and a support layer, a radiation projecting means which projects radiation onto the stimulable phosphor sheet from the support layer side of the stimulable phosphor sheet, and a read-out means which projects stimulating light onto the stimulable phosphor sheet, which has been exposed to the radiation, from the stimulable phosphor layer side of the stimulable phosphor sheet and detects stimulated emission, emitted from the stimulable phosphor layer upon exposure to the stimulating light, from the stimulable phosphor layer side of the stimulable phosphor sheet.

4. A radiation image recording/read-out apparatus as defined in claim 3, in which the read-out means projects the stimulating light at a power density of not lower than $10J/m^2$.

5. A radiation image recording/read-Out apparatus as defined in claim 3, in which the transmittance to the radiation of the part of the stimulable phosphor sheet between the part where the radiation enters the stimulable phosphor sheet from the support layer side and the part where the radiation impinges upon the stimulable phosphor layer is not smaller than 80%.

6. A radiation image recording/read-Out apparatus as defined in claim 3, in which the stimulable phosphor layer is colored by a coloring agent which selectively absorbs light of a wavelength which is equal to that of the stimulating light.

7. The radiation image recording/read-out apparatus of claim 3, wherein the reflecting layer is in direct physical contact with the support layer and the stimulable phosphor layer.

8. A stimulable phosphor sheet comprising a reflective layer which is not longer than 5 μm in scattering length and is interposed between a stimulable phosphor layer and a support layer, wherein radiation is projected onto the stimulable phosphor sheet from the support layer side, stimulating light is projected onto the stimulable phosphor sheet from the stimulable phosphor layer side and stimulated emission, emitted from the stimulable phosphor layer upon exposure to the stimulating light, is detected from the stimulable phosphor layer side of the stimulable phosphor sheet.

9. The stimulable phosphor sheet of claim 8, wherein the reflecting layer is in direct physical contact with the support layer and the stimulable phosphor layer.

\* \* \* \* \*